United States Patent
Patry et al.

(10) Patent No.: US 8,588,957 B2
(45) Date of Patent: Nov. 19, 2013

(54) CUTTING TOOL DATA VERIFICATION SYSTEM AND METHOD

(75) Inventors: Ryan Patry, Hamden, CT (US); Vincent P. Infante, Hamden, CT (US); Douglas J. Ventimiglia, Beacon Falls, CT (US); Kenneth W. Catino, Milford, CT (US); Shikshit N. Parikh, Milford, CT (US)

(73) Assignee: Sikorsky Aircraft Corporation, Stratford, CT (US)

( * ) Notice: Subject to any disclaimer, the term of this patent is extended or adjusted under 35 U.S.C. 154(b) by 0 days.

(21) Appl. No.: 13/279,753

(22) Filed: Oct. 24, 2011

(65) Prior Publication Data

US 2013/0103182 A1 Apr. 25, 2013

(51) Int. Cl.
G06F 19/00 (2011.01)

(52) U.S. Cl.
USPC ........... 700/177; 700/105; 700/106; 700/179; 700/175

(58) Field of Classification Search
None
See application file for complete search history.

(56) References Cited

U.S. PATENT DOCUMENTS

| | | | | |
|---|---|---|---|---|
| 3,587,360 A * | 6/1971 | Oxenham | .......... | 483/10 |
| 3,823,466 A * | 7/1974 | Jerue | .......... | 483/8 |
| 3,868,763 A * | 3/1975 | Sato | .......... | 483/8 |
| 4,185,376 A * | 1/1980 | Johnstone | .......... | 483/10 |
| 4,214,191 A * | 7/1980 | Watanabe et al. | .......... | 318/561 |
| 4,404,506 A * | 9/1983 | Nishimura et al. | .......... | 318/561 |
| 4,742,470 A * | 5/1988 | Juengel | .......... | 700/175 |
| 4,809,426 A * | 3/1989 | Takeuchi et al. | .......... | 365/64 |
| 4,856,177 A * | 8/1989 | Takeuchi et al. | .......... | 483/9 |
| 4,890,306 A * | 12/1989 | Noda | .......... | 377/15 |
| 5,193,421 A * | 3/1993 | Meisinger | .......... | 82/111 |
| 5,205,805 A * | 4/1993 | Otani et al. | .......... | 483/9 |
| 5,257,199 A * | 10/1993 | Tsujino et al. | .......... | 700/160 |
| 5,378,218 A * | 1/1995 | Daimaru et al. | .......... | 483/9 |
| 5,798,928 A | 8/1998 | Niwa | | |
| 5,933,353 A * | 8/1999 | Abriam et al. | .......... | 700/182 |
| 6,047,579 A * | 4/2000 | Schmitz | .......... | 72/15.1 |
| 6,344,018 B1 * | 2/2002 | Aizawa | .......... | 483/29 |
| 6,350,222 B2 * | 2/2002 | Susnjara | .......... | 483/1 |
| 6,718,225 B2 * | 4/2004 | Nicole | .......... | 700/160 |
| 6,907,312 B2 | 6/2005 | Sagawa et al. | | |
| 7,016,745 B1 | 3/2006 | Dickerson et al. | | |
| 7,181,310 B2 * | 2/2007 | Huang et al. | .......... | 700/169 |
| 7,313,458 B2 | 12/2007 | Itoh et al. | | |
| 7,337,038 B2 * | 2/2008 | Lindstrom | .......... | 700/175 |
| 7,580,769 B2 | 8/2009 | Bowman et al. | | |
| 7,684,891 B2 | 3/2010 | Okrongli et al. | | |
| 7,769,484 B2 * | 8/2010 | Senda et al. | .......... | 700/179 |
| 2003/0171841 A1 | 9/2003 | Porter et al. | | |
| 2007/0050079 A1 * | 3/2007 | Itoh et al. | .......... | 700/179 |

* cited by examiner

*Primary Examiner* — Kavita Padmanabhan
*Assistant Examiner* — Christopher E Everett
(74) *Attorney, Agent, or Firm* — Cantor Colburn LLP

(57) ABSTRACT

A method of operating a machining system includes comparing one or more features of a cutting tool to information stored on a data chip secured to a tool holder of the cutting tool. The cutting tool is loaded into the machining system, and the information stored on the data chip is compared to cutting tool requirements of a machining program for instructing operation of the machine. When a result of one or more of the comparisons is outside of a predetermined threshold, operation of the machining system is stopped.

13 Claims, 2 Drawing Sheets

US 8,588,957 B2

CUTTING TOOL DATA VERIFICATION SYSTEM AND METHOD

FEDERAL RESEARCH STATEMENT

This invention was made with Government support under N00019-06-C-0081 awarded by the Department of the Navy. The Government has certain rights in this invention.

BACKGROUND OF THE INVENTION

The subject matter disclosed herein relates to industrial machining. More specifically, the present disclosure relates to management and verification of cutting tool data for an industrial machining center.

Machining of large complex components requires the removal of a great amount of material from an initial piece of raw material. To achieve this material removal a variety of cutting tools are used, some for long durations of time. Each cutting tool has unique characteristics, such as length, diameter, fluting pattern, etc. One or more cutting program, typically NC programs are developed including cutting tool selection and cutting path for various parts of the machining process. When the program or programs are executed correctly, including using the correct cutting tools and following the correct cutting paths, the result is the desired finished component. If an incorrect cutting tool is used at any point in the process, it may result in collision between the tool or tool holder and the part, or other event which damages or even causes the material to be scrapped. The potential sources of cutting tool error include: 1) the cutting tool does not correspond to the programmer's intent such that the cutting tool may be set correctly in its tool holder, but may be dimensionally incorrect (length, diameter, shape does not match programmer's intent; 2) each cutting tool is marked with identifying data in the form of a tag, data chip, or the like on the tool holder, which in some instances, this data may be incorrect; 3) the tool is set in the tool holder incorrectly; or 4) the incorrect cutting tool and tool holder are loaded into the machine for a particular part of the machining program. While the cutting tool is correctly identified, the tool changer apparatus of the machining center may malfunction resulting in the incorrect cutting tool being loaded for use. Reducing or eliminating errors of this sort would result in reduced machining costs through reduction in scrap and/or repair caused by such errors.

BRIEF DESCRIPTION OF THE INVENTION

According to one aspect of the invention, a method of operating a machining system includes comparing one or more features of a cutting tool to information stored on a data chip secured to a tool holder of the cutting tool. The cutting tool is loaded into the machining system, and the information stored on the data chip is compared to cutting tool requirements of a machining program for instructing operation of the machine. When a result of one or more of the comparisons is outside of a predetermined threshold, operation of the machining system is stopped.

According to another aspect of the invention, a machining system includes a machine and a cutting tool operably connectable to the machine. The cutting tool including one or more measurable features. A tool holder is receptive of the cutting tool and includes a data chip including information about the measurable features of the cutting tool. A controller compares contents of the data chip to cutting tool requirements of a machining program for instructing operation of the machine.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
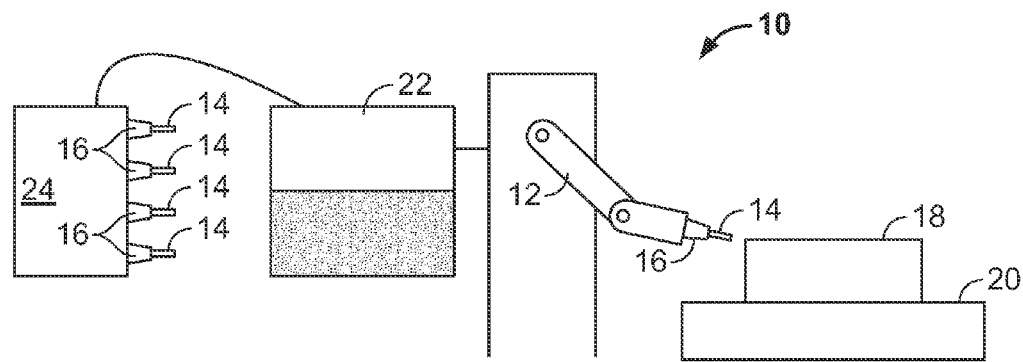
FIG. 1 is a schematic view of an embodiment of a machining system.
Figure 2:
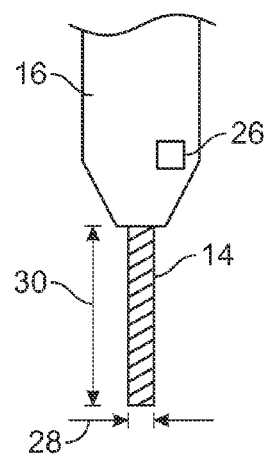
FIG. 2 is a view of an embodiment of a cutting tool for a machining system.

Shown in FIG. 1 is a schematic view of a machining system 10, for example a 5-axis machining system. The machining system 10 includes a machine 12 having a cutting tool 14 at an end of the machine 12. The cutting tool 14 is held in a tool holder 16. When the machining system 10 is operating, the cutting tool 14 rotates about a tool axis and removes material from a workpiece 18 shown on a worktable 20. In some embodiments, the worktable 20 is moveable, translating and/or rotating as desired. Machining of the workpiece 18 is controlled by a controller 22 operably connected to the machine 10. One or more machining programs are loaded into the controller 22 providing instructions regarding path of the cutting tool 14 and also identifying information regarding which cutting tool 14 is used for each portion of the machining program. The various cutting tool 14/tool holder 16 assemblies are located in a tool magazine 24 for retrieval by the machine 12 when instructed by the program. Referring to FIG. 2, the tool holder 16 includes a data chip 26 in which identifying data is stored regarding the cutting tool 14 in the tool holder 16. When the tool holder 16/cutting tool 14 assemblies are loaded into the tool magazine 24, the tool magazine 24 reads the data chip 26 and transmits the cutting tool 14 location in the tool magazine 24 to the controller 22.

Figure 3:
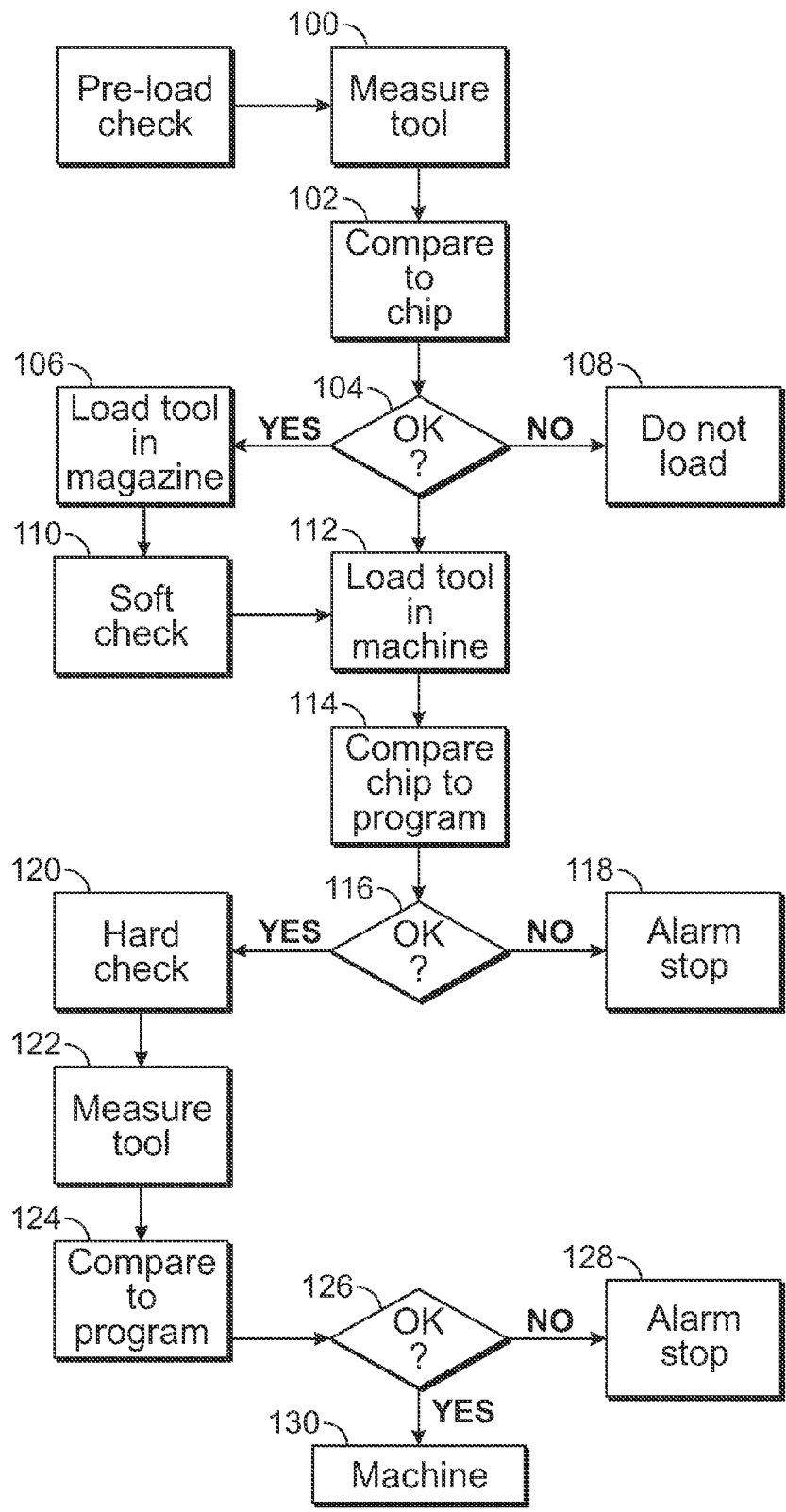
FIG. 3 is an illustration of a method of operation of a machining system.

Referring to FIG. 3, a method will now be described to verify that the correct cutting tool 14 is utilized when called for by the machining program. As stated above, each tool holder 16/cutting tool 14 assembly is identified with information regarding the cutting tool 14 installed in the tool holder 16. This information is stored on a data chip 26 secured to the tool holder 16. This information includes, for example, tool length, tool diameter, tool type, or the like. Prior to the cutting tool 14/tool holder 16 being loaded into the tool magazine 24, a cutting tool diameter 28, cutting tool length 30, and/or other pertinent features are measured in block 100, either by an operator, or by a machine probe (not shown). The measured features are compared with the information stored on the data chip 26 in block 102 to verify that the data chip 26 contains accurate information regarding the particular cutting tool 14. This process is repeated for each cutting tool 14 loaded into the tool magazine 24. In block 104, if measured data matches the data chip 26 within a threshold, the cutting tool 14 is loaded in the tool magazine 24 for use in block 106. If the data is outside of the threshold, in block 108 the cutting tool 14 is not loaded into the tool magazine 24 before the information on the data chip 26 is modified to correspond to the actual cutting tool 14 measurements.

Next, when a cutting tool 14 is installed in the machine 10 for use in block 112, either at the beginning or at a tool change step of the machining program, a subprogram in the controller 22 is initiated. This subprogram compares, in some embodiments the comparison occurs automatically, the information on the data chip 26 with the cutting tool diameter 28 and cutting tool length 30 and other cutting tool 14 information called for by the program in block 114. This "soft check" block 110 verifies that the information on the data chip 26 matches the intent of the programmer. In block 116, if the comparison results in a value outside of a threshold, for example, a cutting tool diameter 28 is too small or too large, or a cutting tool length 30 is too short or too long, an alarm is initiated and the machine 10 will not operate with such a cutting tool 14 installed as in block 118.

Once the soft check is completed, a hard check, block 120, is performed to verify that the actual cutting tool 14, not just the data chip 26, matches the intent of the programmer In this hard check, once the cutting tool 14 is loaded into the machine 10, then in block 122 one or more features such as cutting tool diameter 28 and/or cutting tool length 30 are measured, either manually by the operator or by use of the machine touch probe. In block 124, the measurement(s) are compared to the cutting tool 14 information called for by the program. This verifies that: 1) the cutting tool 14 information corresponds with the information residing on the data chip 26 and 2) that the actual cutting tool 14 features match the cutting tool 14 required by the program. This is useful not only in situations where the incorrect tool is loaded into a tool holder 16 or the incorrect data is on the data chip 26, but in cases where a cutting tool 14 is used over a long period of time in a particular program and has become worn, so that when reloaded into the machine 10 the cutting tool 14 no longer meets the intent of the programmer As with the soft check, if the measurements of the cutting tool 14 fall outside of a selected threshold in block 126, the alarm is initiated in block 128 and the machine 10 will not operate with such a cutting tool 14 installed. If the result of the comparison is within the threshold, the machine 10 will operate in block 130 with the cutting tool 14 installed.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A method of operating a machining system comprising:
    making a first comparison of one or more features of a cutting tool to information stored on a data chip secured to a tool holder of the cutting tool;
    loading the cutting tool into the machining system only if a result of the first comparison is within a first threshold;
    making a second comparison of the information stored on the data chip to cutting tool requirements of a machining program for instructing operation of the machine, the second comparison occurring after loading the cutting tool into the machining system;
    measuring the one or more features of the cutting tool; and
    making a third comparison of the measurements to the cutting tool requirements of the machining program, the third comparison occurring after the second comparison;
    wherein operation of the machining system is stopped if a result of the second comparison is outside of a second threshold or if a result of the third comparison is outside of a third threshold.

2. The method of claim 1, wherein the one or more features of the cutting tool are measured via a machine probe.

3. The method of claim 1, wherein the one or more features comprise one or more of cutting tool length and cutting tool diameter.

4. The method of claim 1, wherein the comparison of the information stored on the data chip to the cutting tool requirements of the machining program occurs automatically.

5. The method of claim 4, wherein the comparison occurs automatically via a subprogram residing in a machining system controller.

6. The method of claim 1, further comprising modifying the information stored on the data chip to correspond with measurements of the one or more features of the cutting tool.

7. The method of claim 1, further comprising loading the cutting tool into a tool magazine after comparing the one or more features of the cutting tool to the information stored on the data chip.

8. The method of claim 1, wherein loading the cutting tool into the machining system comprises installing the cutting tool onto the machine for use.

9. The method of claim 1, wherein the machining program resides in a machine controller.

10. A machining system comprising:
    a machine;
    a cutting tool operably connectable to the machine, the cutting tool including one or more measurable features;
    a tool holder receptive of the cutting tool, the tool holder including a data chip including information about the measurable features of the cutting tool, a result of a first comparison of the one or more measurable features to the information on the data chip within a first threshold resulting in the cutting tool being loaded into the machine;
    a controller to perform a second comparison of contents of the data chip to cutting tool requirements of a machining program for instructing operation of the machine, the second comparison occurring after loading the cutting tool into the machine; and
    a measurement tool to measure the measurable features of the cutting tool wherein the measureable features are comparable to the cutting tool requirements of the machining program after the second comparison occurring.

11. The machining system of claim 10, wherein the measureable features comprise one or more of cutting tool length and cutting tool diameter.

12. The machining system of claim 10, further comprising a subprogram residing at the controller to compare the contents of the data chip to the cutting tool requirements.

13. The machining system of claim 10, further comprising a cutting tool magazine for storage of one or more cutting tools.

* * * * *